US012804649B2

(12) United States Patent
Gao et al.

(10) Patent No.: US 12,804,649 B2
(45) Date of Patent: Nov. 17, 2026

(54) MANAGEMENT OF INTER-CELL BEAM COMMUNICATIONS

(71) Applicant: ZTE CORPORATION, Shenzhen (CN)

(72) Inventors: Bo Gao, Shenzhen (CN); Zhaohua Lu, Shenzhen (CN); Chuangxin Jiang, Shenzhen (CN); Shijia Shao, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 319 days.

(21) Appl. No.: 18/520,058

(22) Filed: Nov. 27, 2023

(65) Prior Publication Data

US 2024/0236982 A1 Jul. 11, 2024

Related U.S. Application Data

(63) Continuation of application No. PCT/CN2021/128916, filed on Nov. 5, 2021.

(51) Int. Cl.

| | |
|---|---|
| ***H04W 72/1273*** | (2023.01) |
| ***H04B 7/06*** | (2006.01) |
| ***H04W 72/566*** | (2023.01) |
| ***H04W 76/20*** | (2018.01) |

(52) U.S. Cl.

CPC .... *H04W 72/1273* (2013.01); *H04B 7/06968* (2023.05); *H04W 72/566* (2023.01); *H04W 76/20* (2018.02)

(58) Field of Classification Search

None

See application file for complete search history.

(56) References Cited

U.S. PATENT DOCUMENTS

| | | | | |
|---|---|---|---|---|
| 2019/0074880 | A1 | 3/2019 | Frenne et al. | |
| 2020/0052844 | A1 | 2/2020 | Yu et al. | |
| 2021/0345299 | A1 | 11/2021 | Gao et al. | |
| 2023/0119019 | A1 | 4/2023 | Matsumura et al. | |
| 2023/0370218 | A1* | 11/2023 | Zhang .................... | H04L 5/0091 |
| 2023/0403108 | A1* | 12/2023 | Grossmann .......... | H04B 7/0617 |

(Continued)

FOREIGN PATENT DOCUMENTS

| | | | |
|---|---|---|---|
| CN | 107409016 | A | 11/2017 |
| CN | 108111272 | A | 6/2018 |

(Continued)

OTHER PUBLICATIONS

Fgi et al., "Discussion of enhancements on multi-beam operation"; 3GPP TSG RAN WGI #106-e R1-2107297, Aug. 16-27, 2021, e-Meeting, (10 pages).

(Continued)

*Primary Examiner* — Saumit Shah

(74) *Attorney, Agent, or Firm* — Foley & Lardner LLP

(57) ABSTRACT

Presented are systems, methods, apparatuses, or computer-readable media for inter-cell beam management. A wireless communication device may determine a first beam state associated with a first type of signal, and a second beam state associated with a second type of signal. The wireless communication device may communicate the first type of signal according to the first beam state. The wireless communication device may communicate the second type of signal according to the second beam state.

20 Claims, 8 Drawing Sheets

(56) References Cited

U.S. PATENT DOCUMENTS

| | | | | |
|---|---|---|---|---|
| 2024/0235783 | A1* | 7/2024 | Matsumura | H04L 5/0094 |
| 2024/0430050 | A1* | 12/2024 | Laddu | H04B 7/00 |
| 2025/0015963 | A1* | 1/2025 | Matsumura | H04L 5/0094 |
| 2025/0142448 | A1* | 5/2025 | Agiwal | H04L 1/1822 |

FOREIGN PATENT DOCUMENTS

| | | | |
|---|---|---|---|
| CN | 108289016 | A | 7/2018 |
| CN | 111901020 | A | 11/2020 |
| WO | WO-2020/086572 | A1 | 4/2020 |
| WO | WO-2021/093176 | A1 | 5/2021 |
| WO | WO-2021/186726 | A1 | 9/2021 |

OTHER PUBLICATIONS

International Search Report and Written Opinion for PCT Appl. No. PCT/CN2021/128916 mailed Jul. 27, 2022 (with English translation, 9 pages).
Extended European Search Report for EP Appl. No. 21962922.7, dated Jan. 27, 2025 (13 pages).
First Office Action for CN Appl. No. 202411206166.9, dated Mar. 27, 2025 (with English translation, 15 pages).
Vivo, "Maintenance on beam related issues", 3GPP TSG RAN WG1 #105-e, R1-2105469, May 27, 2021, e-Meeting (6 pages).
Apple Inc., "On Beam Management Enhancement", 3GPP TSG-RAN WG1 Meeting #106b-e, R1-2110013, Oct. 19, 2021, e-Meeting (21 pages).
Ericsson, "Remaining issues on multi-beam enhancements", 3GPP TSG-RAN WG1 Meeting #106bis-e, Tdoc R1-2109110, Oct. 19, 2021, e-Meeting, (23 pages).
Huawei, et al., "Support of inter-cell beam management", 3GPP TSG-RAN WG2 Meeting #115-e, R2-2108442, Aug. 27, 2021, Electronic (5 pages).
Mediatek Inc., "Enhancement on multi-beam operation", 3GPP TSG RAN WG1 #106bis-e, R1-2109543, Oct. 19, 2021, e-Meeting (27 pages).
Mediatek Inc., "UE Features for further enhancements on NR MIMO", 3GPP TSG RAN WG1 Meeting #106bis-e, R1-2109549, Oct. 19, 2021, e-Meeting (20 pages).
Moderator (Samsung), "Summary of offline discussion on unified TCI and inter-cell beam management", 3GPP TSG RAN WG1 #106bis-e, R1-2109467, e-Meeting, Oct. 19, 2021 (26 pages).
Nokia et al., "Enhancements on Multi-beam Operation", 3GPP TSG RAN WG1 #106-bis-e, R1-2109870, Oct. 19, 2021, e-Meeting (28 pages).
Samsung, "Considerations on the support of inter-cell beam management", 3GPP TSG-RAN2 Meeting #115 Electronic, R2-2108632, Aug. 27, 2021 (4 pages).
Vivo, "Further discussion on multi beam enhancement", 3GPP TSG RAN WG1 #106b-e, R1-2108951, Oct. 19, 2021, e-Meeting (26 pages).
ZTE, "Enhancements on Multi-beam Operation", 3GPP TSG RAN WG1 Meeting #106bis-e, R1-2108870, Oct. 19, 2021, e-Meeting (26 pages).
First Office Action on KR Appl. No. 10-2023-7040836, mailed Apr. 22, 2026 (10 pages, including English translation).
NTT Docomo, Inc., "Offline summary for PDCCH structure and search space", 3GPP TSG RAN WG1 #95, R1-1813933, Nov. 13, 2018 (94 pages).

* cited by examiner

MANAGEMENT OF INTER-CELL BEAM COMMUNICATIONS

CROSS-REFERENCE TO RELATED APPLICATION

This application claims the benefit of priority under 35 U.S.C. § 120 as a continuation of International Patent Application No. PCT/CN2021/128916, filed on Nov. 5, 2021, the disclosure of which is incorporated herein by reference in its entirety.

TECHNICAL FIELD

The disclosure relates generally to wireless communications, including but not limited to systems and methods for inter-cell beam management.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for inter-cell beam management. A wireless communication device may determine a first beam state associated with a first type of signal, and a second beam state associated with a second type of signal. The wireless communication device may communicate the first type of signal according to the first beam state. The wireless communication device may communicate the second type of signal according to the second beam state.

In some embodiments, the first beam state may be associated with a physical cell identifier (PCI) different from that of a serving cell. In some embodiments, the second beam state may be associated with a PCI that is same as that of the serving cell. In some embodiments, the second beam state may be associated with the serving cell.

In some embodiments, the first or second beam state may include at least one of a quasi co-location (QCL) assumption, a transmission configuration indicator (TCI) state, a spatial relation, a reference signal (RS), a spatial filter or a pre-coding. In some embodiments, the first type of signal may include a user equipment (UE) dedicated channel or a UE dedicated reference signal (RS). In some embodiments, the second type of signal may include a non UE dedicated channel or a non UE dedicated RS.

In some embodiments, the first or second type of signal may include at least one of: a control resource set (CORESET), physical downlink control channel (PDCCH) or search space (SS) set, or a physical downlink shared channel (PDSCH), physical uplink shared channel (PUSCH), physical uplink control channel (PUCCH), channel state information RS (CSI-RS), or sounding RS (SRS).

In some embodiments, the second type of signal may include at least one of: a type-0, type-0A, type-1, type-2, or type-3 common search space (CSS) set; a control resource set (CORESET) or a physical downlink control channel (PDCCH) associated with the type-0, type-0A, type-1 or type-2 CSS set; a CORESET or a PDCCH with a flag, the flag to indicate that the CORESET or the PDCCH does not share a same beam state as the first type of signal, to indicate that a second scheme or a third scheme is applied to the CORESET or the PDCCH, or to indicate that the first scheme is precluded from being applied to the CORESET or the PDCCH; or a CORESET or a PDCCH with a SS set for beam failure recovery, or CORESET #0.

In some embodiments, if the type-0, type-0A, type-1 or type-2 CSS set can be associated with a synchronization block (SSB) of the second beam state that is activated or indicated, the wireless communication device may monitor at least one of: the type-0, type-0A, type-1, or type-2 CSS set; a PDCCH associated with the type-0, type-0A, type-1, or type-2 CSS set; or a CORESET associated with the type-0, type-0A, type-1, or type-2 CSS set.

In some embodiments, the second type of signal may include at least one of: a configured grant PDSCH; a configured grant PUSCH; a signal scheduled by or initialized by downlink control information (DCI). The DCI may correspond to at least one of: a type-0, type-0A, type-1, type-2, or type-3 common search space (CSS) set; a control resource set (CORESET) associated with the type-0, type-0A, type-1 or type-2 CSS set; a CORESET with a flag, the flag to indicate that the CORESET or the PDCCH does not share a same beam state as the first type of signal, to indicate that a second scheme or a third scheme is applied to the CORESET or the PDCCH, or to indicate that the first scheme is precluded from being applied to the CORESET or the PDCCH; or a CORESET with a search space (SS) for beam failure recovery, or CORESET #0.

In some embodiments, the first type of signal may include at least one of: a control resource set (CORESET) or search space (SS) set other than the second type of signal, or other than a non-UE dedicated CORESET or SS set; a CORESET or a physical downlink control channel (PDCCH) that is not associated with a type-0 or type-0A common SS (CSS) set; a CORESET or a PDCCH that is not associated with a type-0, type-0A or type-1 CSS set; a CORESET or a PDCCH that is not associated with a type-0, type-0A, type-1 or type-2 CSS set; a CORESET or a PDCCH that is only associated with a USS, one or both of the USS and a type-3 CSS set, one or both of the USS and a type-2 or type 3 CSS set, or one or both of the USS and a type-1, type-2 or type 3 CSS set; or a CORESET or a PDCCH with a flag, the flag to indicate that the CORESET or the PDCCH share a same beam state as the first type of signal, or to indicate that the first scheme is applied to the CORESET or the PDCCH.

In some embodiments, the first type of signal may include at least one of: a signal that is not scheduled by or initialized by the second type of signal, or by a non-UE dedicated CORESET or search space (SS) set; a signal with a flag, the flag to indicate that the first scheme is applied to the signal; a signal scheduled by or initialized by downlink control information (DCI). The DCI may correspond to at least one of: a control resource set (CORESET) or search space (SS) set other than the second type of signal, or other than a non-UE dedicated CORESET or SS set; a CORESET or a physical downlink control channel (PDCCH) that is not associated with a type-0 or type-0A common SS (CSS) set; a CORESET or a PDCCH that is not associated with a type-0, type-0A or type-1 CSS set; a CORESET or a PDCCH that is not associated with a type-0, type-0A, type-1 or type-2 CSS set; a CORESET or a PDCCH that is only associated with a USS, one or both of the USS and a type-3 CSS set, one or both of the USS and a type-2 or type 3 CSS set, or one or both of the USS and a type-1, type-2 or type 3 CSS set; or a CORESET or a PDCCH with a flag, the flag to indicate that the CORESET or the PDCCH share a same beam state as the first type of signal, or to indicate that the first scheme is applied to the CORESET or the PDCCH.

In some embodiments, the wireless communication device may determine at least one beam state comprising the first beam state or the second beam state, according to a beam determination scheme, the beam determination scheme comprising a first scheme, a second scheme or a third scheme. In some embodiments, the first scheme may include applying the at least one beam state to at least one uplink (UL) signal, at least one downlink (DL) signal, or both, starting from a first slot that is a defined number of time units after an acknowledgement corresponding to the DCI carrying an indication of the at least one beam state. In some embodiments, the first scheme may include applying the at least one beam state to at least one UL signal, at least one DL signal, or both, starting from a first slot that is a second defined number of time units after an acknowledgement of a physical downlink shared channel (PDSCH) carrying a MAC CE signaling for activating the at least one beam state.

In some embodiments, if a scheduling or triggering offset corresponding to the first type of signal is larger than or equal to a threshold, the at least one beam state determined by the first scheme may be applied to the first type of signal. In some embodiments, if an offset between the first type of signal and the second type of signal is larger than or equal to the threshold, the at least one beam state determined by the first scheme may be applied to the first type of signal. In some embodiments, the second type of signal may include a control resource set (CORESET), physical downlink control channel (PDCCH) or search space (SS) set. The second type of signal may be monitored.

In some embodiments, the second scheme may include at least one of: applying the at least one beam state to a downlink signal whose scheduling or triggering offset is less than or equal to a threshold. The at least one beam state may be determined according to a control resource set (CORESET). The CORESET may include at least one of: a CORESET with a lowest index in a last monitored time unit; a non-UE dedicated CORESET; or a CORESET with a lowest index from another second type of signal in the last monitoring time unit.

In some embodiments, if a scheduling or triggering offset between the second type of signal and another second type of signal is less than a threshold, the at least one beam state may be determined according to the second scheme. The second type of signal may include at least one of: a physical downlink shared channel (PDSCH), or a channel state information reference signal (CSI-RS), and wherein the another second type of signal comprises at least one of: a control resource set (CORESET) or a physical downlink control channel (PDCCH) scheduling or triggering the second type of signal.

In some embodiments, the third scheme may include applying the at least one beam state to a physical downlink shared channel (PDSCH). The at least one beam state may be indicated by: a corresponding medium access control control element (MAC CE) signaling, a beam state for a CORESET carrying a scheduling downlink control information (DCI), or an indicated beam state in the scheduling DCI. In some embodiments, the third scheme may include applying the at least one beam state to a CORESET, physical downlink control channel (PDCCH) or channel state information reference signal (CSI-RS). The beam state may be indicated via downlink control information (DCI), medium access control control element (MAC CE) or radio resource control (RRC) signaling.

In some embodiments, the wireless communication device may have a capability for supporting the first scheme and the second scheme. In some embodiments, a configuration received by the wireless communication device may enable the first scheme, the second scheme, or both the first and second schemes.

In some embodiments, an offset between the second type of signal and a corresponding downlink control information (DCI) signaling may be greater than or equal to a threshold. In some embodiments, the second type of signal may use the second beam state. In some embodiments, a downlink signal may be buffered, or a beam state or quasi-co-location (QCL) assumption may be determined for the downlink signal, based on at least one of: the first scheme has a higher priority than the second scheme, and a lower priority than the third scheme; the second scheme and the third scheme each has a higher priority than the first scheme; an indicated beam state in the second type of signal is not considered when the first scheme is enabled; the second scheme is higher priority than the first scheme, or the second scheme is applied, when a condition is met; or the first scheme is applied when the condition is not met.

In some embodiments, the condition may include at least one of: a scheduling offset between the downlink signal and the second type of signal may be less than a threshold or the second type of signal is within a time unit. In some embodiments, if a control resource set (CORESET) or physical downlink control channel (PDCCH) and a physical downlink shared channel (PDSCH) or channel state information reference signal (CSI-RS) may be overlapped in a time units, and if a beam state corresponding to the CORESET or PDCCH is different from that corresponding to the PDSCH or CSI-RS, then reception of the CORESET or PDCCH may be prioritized.

In some embodiments, the beam state corresponding to the PDSCH or CSI-RS may be determined according to the first scheme. In some embodiments, the beam state corresponding to the CORESET may be determined according to the third scheme. In some embodiments, a scheduling or triggering offset corresponding to the PDSCH or CSI-RS may be less than a threshold. In some embodiments, if a triggering state for the CSI-RS is not associated with the at least one beam state, or if a scheduling offset for the CSI-RS is less than the threshold, the beam state corresponding to the CSI-RS may be determined according to the first scheme.

In some embodiments, when a CORESET or a common search space (CSS) is applied with a beam state that is associated with a physical cell identifier (PCI) different from that of a serving cell, the wireless communication device may monitor at least one of: all CSSs in the CORESET; a CSS that is monitored in the serving cell; a CSS corresponding to a synchronization signal block (SSB) associated with a previous beam state that is associated with a PCI that is same as that of the serving cell or not associated with the PCI different from that of the serving cell; a CSS corresponding to a SSB associated with the beam state; or a CSS within a time unit that is configured by radio resource control (RRC) signaling.

In some embodiments, if the second type of signal is to be monitored in a time unit, the beam state corresponding to an uplink signal and a downlink signal may be determined according to the second scheme. In some embodiments, if an offset between a physical downlink control channel (PDCCH) or downlink control information (DCI) signaling and a corresponding scheduling physical downlink shared channel (PDSCH) or channel state information reference signal (CSI-RS) is less than a threshold, the beam state corresponding to the scheduling PDSCH or CSI-RS may be determined according to the second type of signal. In some embodiments, a mode for enabling the first scheme or inter-cell beam management may be enabled.

In some embodiments, the second type of signal may have a lowest index (ID) of a plurality of second type of signals. In some embodiments, the beam state may be determined according to the second type of signal that is associated with a search space with a lowest control resource set (CORESET) index (ID) in a latest slot in which one or more second type of signals within an active bandwidth part (BWP) of a serving cell are monitored by the wireless communication device.

In some embodiments, a medium access control control element (MAC CE) may have a flag for a beam state, to deactivate any activated beam state for the second type of signal. In some embodiments, when the first beam state is applied, a beam state for the second type of signal can be deactivated, or the second type of signal may be not monitored. In some embodiments, when a beam state is associated with a physical cell identifier (PCI) different from that of a serving cell, the wireless communication device may not monitor the second type of signal.

At least one aspect is directed to a system, a method, an apparatus, or a computer-readable medium for inter-cell beam management. A wireless communication node may communicate with a wireless communication device, a first type of signal according to a first beam state. The wireless communication node may communicate, with the wireless communication, a second type of signal according to a second beam state. The first beam state may be associated with the first type of signal, and the second beam state may be associated with the second type of signal.

BRIEF DESCRIPTION OF THE DRAWINGS

Various example embodiments of the present solution are described in detail below with reference to the following FIGURES or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying FIGURES to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
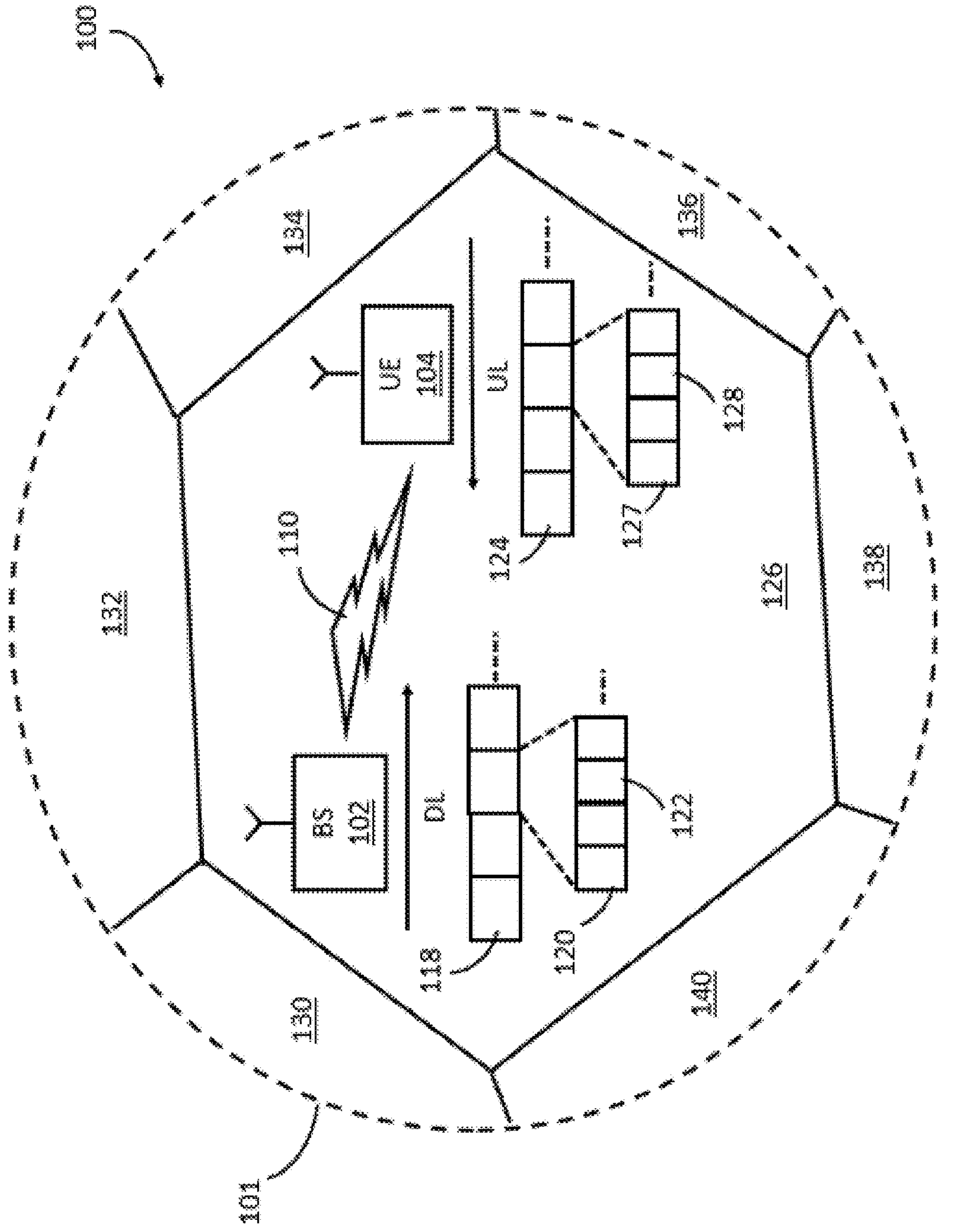
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
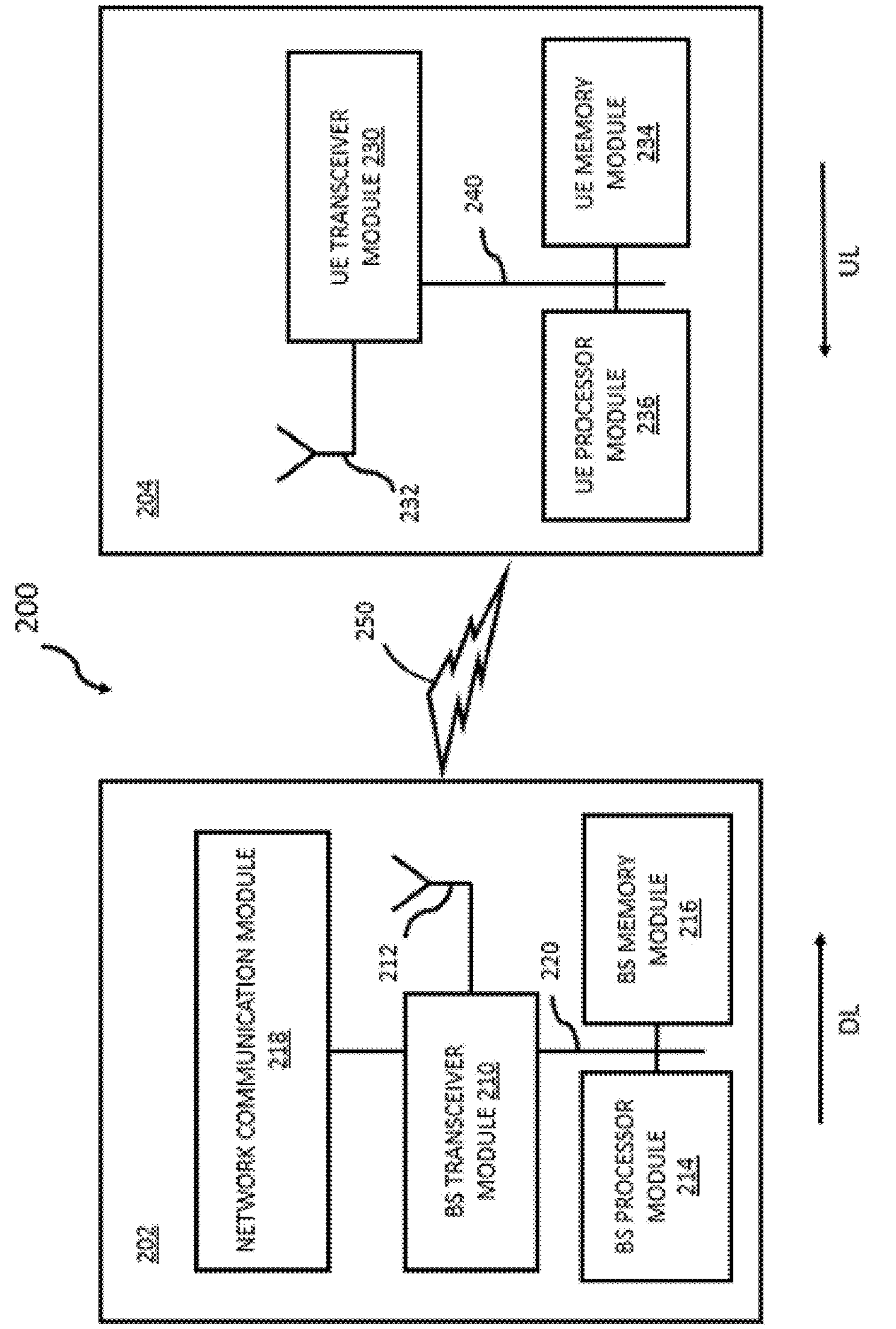
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Inter-Cell Beam Management

Under 5G new radio (NR), analog beam-forming may be introduced into mobile communication for guaranteeing the robustness of high frequency communications. For a downlink (DL) transmission, quasi-co location (QCL) state (also referred to transmission configuration indicator (TCI) state or a beam state) may be introduced for supporting beam indication for DL control channel (e.g., a physical downlink control channel (PDCCH)), DL data channel (e.g., physical downlink sharing channel (PDSCH)), and channel-state-information reference signalling (CSI-RS). Similarly, for uplink (UL) transmission, spatial relation information (a corresponding higher layer parameter may be called as spatialRelationInfo) may be introduced for supporting beam indication for UL control channel (e.g., physical uplink control channel (PUCCH)) and sounding reference signal (SRS). Besides, beam indication for the UL data channel (e.g., physical uplink shared channel (PUSCH)) may be achieved through mapping with one or more SRS resources, which are indicated by gNB, and ports of the UL data channel. As such, the beam configuration for UL data channel can be derived from the spatial relation information associated with SRS resources or ports accordingly. Then, a unified TCI framework may be introduced, and based on that, a single TCI state can be applied to both or either of DL signalling (e.g., PDSCH, PDCCH, or CSI-RS) and UL signalling (e.g., PUSCH, PUCCH, or SRS) for determining the corresponding transmission or reception (Tx/Rx) beam(s).

Although some approaches under 5G NR with flexible configuration is applicable for different scenarios, there may be a clear limitation for maximum number of reference signals (RS), (e.g., up to 64 SSB), taking into account user equipment (UE) implementation complexity. From a network perspective, the candidate beams and introducing more virtual sites that are transparent to UE may be very limited. But, due to high path loss and link blockage, the coordination (e.g., first switching between neighboring transmission/reception points (TRP) or cells) may become relied on for reliability. Therefore, a flexible inter-cell beam management to support fast switching between two different cells (e.g., from different physical sites) should be considered.

Figure 3:
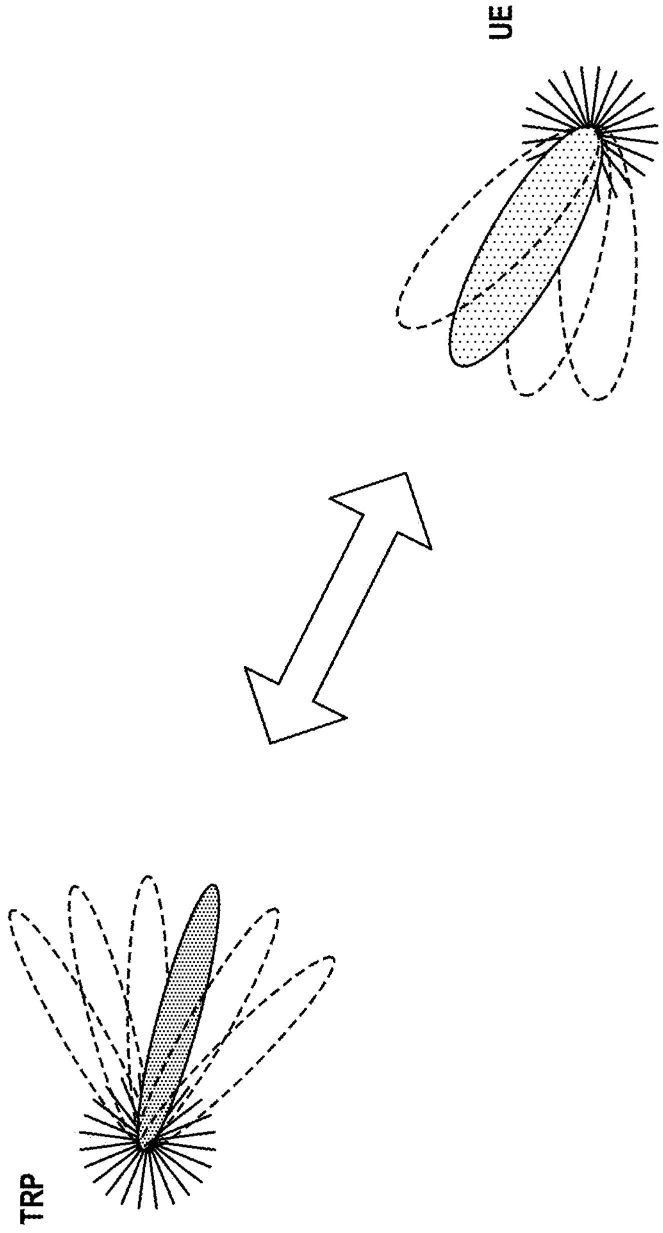
FIG. 3 illustrates a block diagram of an environment for a beam-based uplink and downlink (UL/DL) transmission, in accordance with an illustrative embodiment.

To achieve this target, the following issues should be well handled. First, in order to minimize the network impact, different UE behavior corresponding to the non-dedicated and dedicated channel or RS may be distinguished. For UE dedicated channel or RS, the corresponding beam can be switched to the neighboring cell. For non-dedicated channel or RS, the corresponding beam indication may be based on the current serving cell. In such case, which type of channel and RSs are relevant to UE dedicated or non-dedicated may be identified. Second, the different UE behaviors may be factored in for achieving this functionality. For instance, there may be two candidate UE types. Under one type, the UE can support more than one activated TCI state. Under another type, the UE only can support a single activated TCI state. Specifically, for latter case, handling UE monitoring requirement may be determined for non-dedicated channel (e.g., common search space for paging and system information/message), once the beam is switched to the neighboring cell for data transmission. Third, the timeline and default rules for handling beam corresponding to PDSCH or aperiodic CSI-RS (AP-CSI-RS) whose scheduling offset is less than a threshold may be considered as compatible for inter-cell and intra-cell beam management (e.g., legacy approach) well A. Antenna Array and Beam Management Context Referring now to FIG. 3, depicted is a block diagram of an environment for a beam-based uplink and downlink (UL/DL) transmission. As depicted, the full line may represent a selected transmission/reception (Tx/Rx) beam for transmission. As the expense of wide or ultra-wide spectrum resources, the considerable propagation loss induced by the extremely high frequency may be a challenge. To solve this, antenna array and beam-forming training technologies using massive multiple input, multiple output (MIMO) (e.g., up to 1024 antenna elements for one node) may be adopted to achieve beam alignment and obtain sufficiently high antenna gain. To keep low implementation cost while still benefit from antenna array, analog phase shifters may become very attractive for implementing millimeter wave (mmWave) beam-forming. As such, the number of controllable phases may be finite and the constant modulus constraints may be placed on these antenna elements. Given the pre-specified beam patterns, the variable-phase-shift-based BF training may target to identify the best pattern for subsequent data transmission generally, in the one-TRP and one-panel case.

In this disclosure, a beam state may be equivalent to quasi-co-location (QCL) state, transmission configuration indicator (TCI) state, spatial relation (also called as spatial relation information), reference signal (RS), group information, spatial filter or pre-coding. Furthermore, beam state may also be called as beam. Specifically, a Tx beam may be equivalent to QCL state, TCI state, spatial relation state, DL reference signal, UL reference signal, Tx spatial filter, or Tx precoding. A Rx beam may be equivalent to QCL state, TCI state, spatial relation state, spatial filter, Rx spatial filter, or Rx precoding. A beam identifier (ID) may be equivalent to QCL state index, TCI state index, spatial relation state index, reference signal index, spatial filter index, or precoding index.

The spatial filter can be either UE-side or gNB-side one, and the spatial filter may also called as spatial-domain filter. Spatial relation information may be comprised of one or more reference RSs. The RSs may represent the same or quasi-co spatial relation between targeted RS or channel and the one or more reference RSs. Spatial relation may refer to the beam, spatial parameter, or spatial domain filter.

A QCL state may be comprised of one or more reference RSs and their corresponding QCL type parameters. The QCL type parameters may include at least one of the following aspect or combination: Doppler spread, Doppler shift, delay spread, average delay, average gain, and spatial parameter (which may also called as spatial Rx parameter). Furthermore, a TCI state may be equivalent to QCL state. There may be multiple types of QCLs: 'QCL-TypeA' (including {Doppler shift, Doppler spread, average delay, delay spread}), 'QCL-TypeB' (including {Doppler shift, Doppler spread}), 'QCL-TypeC' (including {Doppler shift, average delay}), and 'QCL-TypeD' (including {Spatial Rx parameter}).

A RS may include channel state information reference signal (CSI-RS), synchronization signal block (SSB) (also called as synchronization signal, physical broadcast channel (SS/PBCH)), demodulation reference signal (DMRS), sounding reference signal (SRS), and physical random access channel (PRACH). Furthermore, the RS may include at least DL reference signal and UL reference signalling. A DL RS may at least include CSI-RS, SSB, DMRS (e.g., DL DMRS). A UL RS may at least include SRS, DMRS (e.g., UL DMRS), and PRACH. A UL signal can include PUCCH, PUSCH, or SRS. A DL signal can include PDCCH, PDSCH, or CSI-RS. A group based reporting may include at least one of beam group based reporting and antenna group based reporting.

A beam group may include different Tx beams within one group that can be simultaneously received or transmitted or Tx beams between different groups that may not be simultaneously received or transmitted. Furthermore, a beam group may be described from the UE perspective. An antenna group may include different Tx beams within one group may that may be simultaneously received or transmitted or Tx beams between different groups that can be simultaneously received or transmitted. Furthermore, an antenna group may include more than N different Tx beams within one group that may not be simultaneously received or transmitted or no more than N different Tx beams within one group that can be simultaneously received or transmitted, where N is positive integer. In addition, the antenna group may include Tx beams between different groups that can be simultaneously received or transmitted. The antenna group may be described from the UE perspective. The antenna group may be equivalent to antenna port group, panel or UE panel. Furthermore, antenna group switching may be equivalent to panel switching.

Group information may be equivalent to information grouping one or more reference signals, resource set, panel, sub-array, antenna group, antenna port group, group of antenna ports, beam group, transmission entity/unit, or reception entity/unit, among others. Furthermore, the group information may represent the UE panel and some features related to the UE panel. Furthermore, the group information may be equivalent to group state or group ID. A time unit can be sub-symbol, symbol, slot, subframe, frame, or transmission occasion, among others. DCI may be equivalent to PDCCH or CORESET. PDCCH may be equivalent to CORESET.

B. Inter-Cell Beam Management for L1-Centric Mobility

Figure 4:
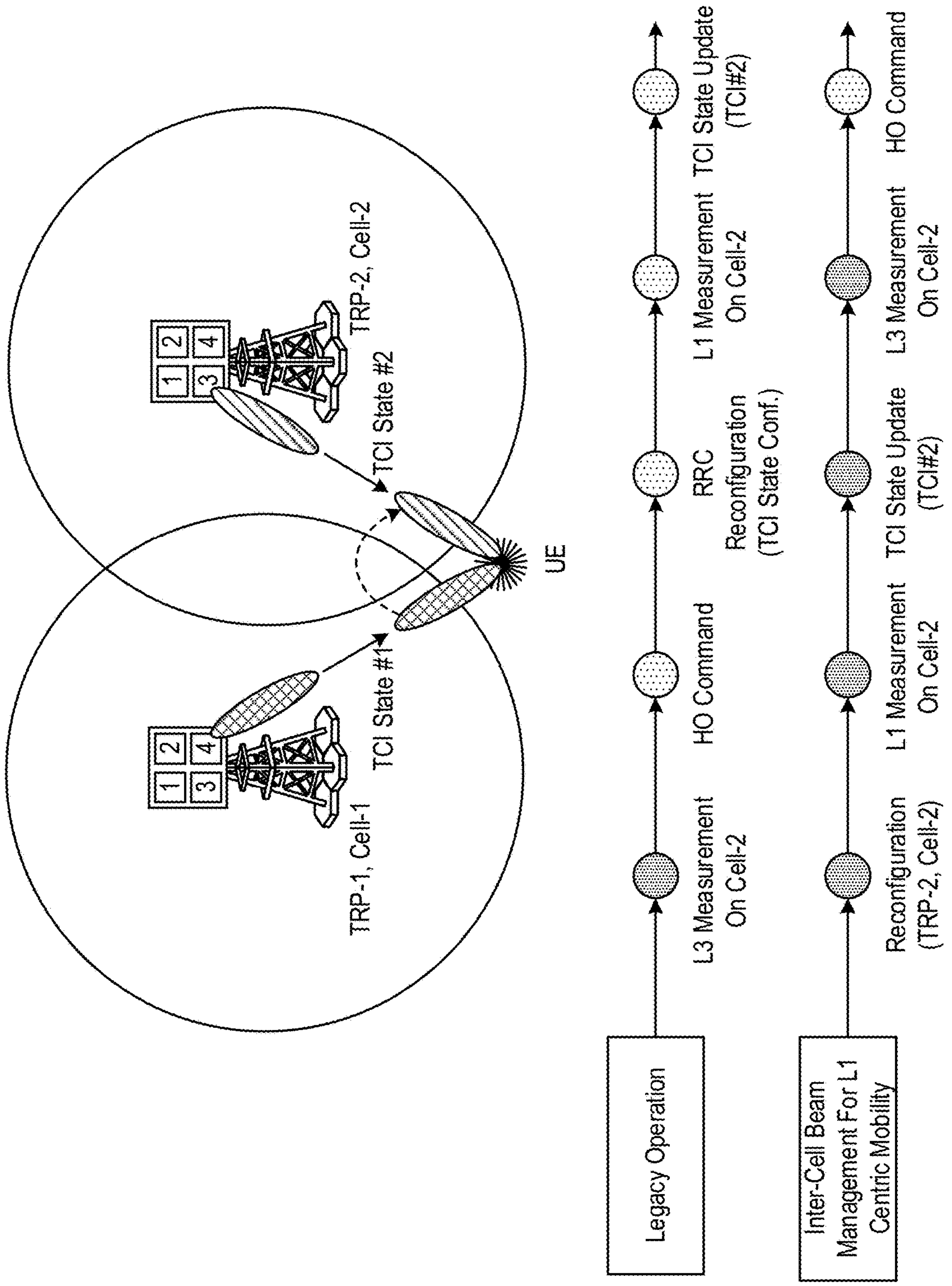
FIG. 4 illustrates a block diagram of a system for inter-cell beam management for L1-centric mobility with multiple transmission/reception points (TRP) points in accordance with an illustrative embodiment.

Referring now to FIG. 4, depicted is a block diagram of a system for inter-cell beam management for L1-centric mobility with multiple transmission/reception points (TRPs). An inter-cell beam management may be to achieve the dynamic switching from serving cell to neighboring cell at least for UE-dedicated channel. The procedure of inter-cell beam management, or called as L1-centric mobility may be as follows.

First, the UE may receive, from a serving cell, configuration of synchronization signal blocks (SSBs) of the TRPs with different PCIs for beam measurement, and configurations to use in radio resources (e.g., physical data and control channel) for data transmission or reception corresponding to the TRPs with different PCIs (e.g., configuration for beam measurement for the TRPs with different PCIs). Second, the UE may perform beam measurement for the TRPs with different PCIs and report the measurement to the serving cell. Third, based on the above reports, TCI state(s) (e.g., beam state(s)) associated with the TRPs with different PCIs may be activated from the serving cell (e.g., by L1/L2 signaling). Fourth, the UE may receive and transmit using UE-dedicated channel on TRPs with different PCIs. Fifth, the UE may be in coverage of a serving cell always, also for multi-TRP case. For example, the UE may use common channels (e.g., BCCH, PCH, etc.) from the serving cell (as in legacy).

Non-UE dedicated search space (SS) set can be divided into the following categories. First, the non-UE dedicated SS set may include a Type-0/0A common searching space (CSS) set. Type 0 CSS set (also called as Type0-PDCCH CSS set) may be configured by pdcch-ConfigSIB1 in MIB or by searchSpaceSIB1 in PDCCH-ConfigCommon or by searchSpaceZero in PDCCH-ConfigCommon. Furthermore, downlink control information (DCI) format in CCS Type 0 may be cyclic redundancy check (CRC) scrambled by a system information, radio network temporary identifier (SI-RNTI) (e.g., on the primary cell of a master cell group (MCG)). Type 0A CSS set (also called as Type0A-PDCCH CSS set) may be configured by searchSpaceOtherSystem- Information in PDCCH-ConfigCommon. Furthermore, DCI format in CSS Type 0A may be CRC scrambled by a SI-RNTI (e.g., on the primary cell of the MCG)

Second, the non-UE dedicated SS set may include Type-1 CSS set. Type 1 CSS set (also called as Type1-PDCCH CSS set) may be configured by ra-SearchSpace in PDCCH-ConfigCommon. Furthermore, DCI format in CSS Type 1 is CRC scrambled by a RA-RNTI or a TC-RNTI (e.g., on the primary cell). Third, the non-UE dedicated SS set may include Type-2 CSS set. Type 2 CSS set (also called as Type2-PDCCH CSS set) may be configured by paging-SearchSpace in PDCCH-ConfigCommon. Furthermore, DCI format in CSS Type-2 is CRC scrambled by a paging, radio network temporary identifier (P-RNTI) on the primary cell of the MCG.

Fourth, the non-UE dedicated SS set may include Type-3 CSS set. Type-3 CSS set (also called as Type3-PDCCH CSS set) may be configured by SearchSpace in PDCCH-Config with searchSpaceType common. Furthermore, DCI format in CSS Type-3 is CRC scrambled by an interruption RNTI (INT-RNTI), a slot format indication RNTI (SFI-RNTI), transmit power control (TPC) PUSCH RNTI (TPC-PUSCH-RNTI), TPC-PUCCH-RNTI, or TPC-SRS-RNTI and, only for the primary cell, cell RNTI (C-RNTI), modulation and coding scheme C-RNTI (MCS-C-RNTI), or configured scheduling RNTI (CS-RNTI(s)), among others. Fifth, the non-UE dedicated SS set may include UE-specific search space (USS) set. USS set (also called as USS) may be configured by SearchSpace in PDCCH-Config with searchSpaceType ue-Specific for DCI formats with CRC scrambled by C-RNTI, MCS-C-RNTI, semi-persistent CSI-RNTI (SP-CSI-RNTI), or CS-RNTI(s).

C. Non UE Dedicated Channel or Reference Signal (RS) and UE Dedicated Channel or RS For non-UE dedicated channel or RS and UE dedicated channel or RS may have differing considerations. The non UE dedicated channel or RS may be referred to a non-UE dedicated signal, and the UE dedicated channel or RS may be referred to as UE dedicated signal. A non-UE dedicated signal may include various types of signals. In some embodiment, a non-UE dedicated signal may include non-UE dedicated CORESET, non-UE dedicated PDCCH, or non-UE dedicated SS set. In some embodiments, a non-UE dedicated signal may include Type-0/0A, Type-1, Type-2, or Type-3 CSS set. Furthermore, the Type-0/0A, Type-1, Type-2, or Type-3 CSS set may be associated with SSB of activated or indicated beam state (e.g., TCI state).

In some embodiments, a non-UE dedicated signal may include a control resource set (CORESET) or a PDCCH (DCI) associated with CSS Type-0/0A/1, or CORESET or a PDCCH (DCI) associated with CSS Type. For instance, PDCCH (using resources in the CORSET) MAC-CE for Rel-15/16 may be used. The source RS configured or indicated in the beam state (e.g., TCI state) may be associated with a SSB (serving cell). Furthermore, the Type-0/0A, Type-1, Type-2, or Type-3 CSS set may be associated with SSB of activated or indicated beam state (e.g., TCI state).

In some embodiments, a non-UE dedicated signal may include CORESET or a PDCCH (DCI) with a flag. For example, the flag may be to indicate that the CORESET does not share the same TCI or QCL assumption as UE dedicated signals, or indicate that the beam determination scheme 2 or beam determination scheme 3 are applied to the CORESET. Furthermore, this flag or indication is introduced for CORESET(s) that is assumed to be a non-UE dedicated CORESET/PDCCH, or that is not applied by the beam state determined by beam determination scheme 1 (e.g., unified TCI state). CORESET with search space for beam failure recovery (BFR), or CORESET #0. The beam determination schemes 1, 2, and 3 are discussed below in sub-section D.

In some embodiments, non-UE dedicated PDSCH, PUSCH, PUCCH, CSI-RS, or SRS may include PDSCH, PUSCH, PUCCH, CSI-RS or SRS scheduled by or initialized by DCI. The DCI may correspond to at least one of: CSS Type-0/0A, CSS Type-1, CSS Type-2, or CSS Type-3; CORESET associated with CSS Type-0/0A/1, or CORESET associated with CSS Type-2; CORESET with a flag (e.g., to indicate that CORESET shares the same beam state, TCI or QCL assumption as UE dedicated signals, or indicate that the beam determination scheme 1 is applied to the CORESET); a CORESET with search space for beam failure recovery (BFR), or CORESET #0. In some embodiments, non-UE dedicated PDSCH, PUSCH, PUCCH, CSI-RS, or SRS may include PDSCH that further comprises configured grant PDSCH or PUSCH that further comprises configured grant PUSCH.

UE dedicated signal may include UE dedicated CORESET, PDCCH, or SS-set. In some embodiments, the UE dedicated CORESET, PDCCH, or SS-set may include at least one of: a CORESET or SS set other than a non-UE dedicated CORESET or SS set; Type-1 CSS, Type-2 CSS, Type-3 CSS, or USS; CORESET that is NOT associated with CSS Type-0/0A; CORESET that is NOT associated with CSS Type-0/0A/1; CORESET that is NOT associated with CSS Type-0/0A/1/2; CORESET that is only associated with USS, both or either of USS and CSS Type-3, both or either of USS and CSS Type2/3, or both or either of USS and CSS Type1/2/3; and CORESET without the flag.

In some embodiments, the UE dedicated signal may include UE dedicated PDSCH, PUSCH, PUCCH, CSI-RS, or SRS. The UE dedicated PDSCH, PUSCH, PUCCH, CSI-RS, or SRS may include at least one of: a PDSCH, PUSCH, PUCCH, CSI-RS, or SRS that is NOT initialized by non-UE dedicated CORESET or SS set; and PUSCH, PUCCH, CSI-RS, or SRS D. Beam Indication when Considering Multiple Types of Schemes There may be several beam indication schemes that can be applied to the UE. To properly operate, a flexible co-existence rules may be provided and configured on the UE. There may be a number of beam indication or determination schemes, such as: beam determination scheme 1, 2, and 3.

The beam determination scheme 1 (e.g., Rel-17 unified TCI solution) may specify that the beam state (e.g., TCI state) is to be applied to DL or UL signals starting from the first slot that is X time units (e.g., symbols) after the last symbol of the acknowledgment of the beam state indication (e.g., TCI indication). Furthermore, in such case, the activated beam state (e.g., TCI state) by MAC-CE may be more than one.

In some embodiments, the beam determination scheme 1 may specify that the beam state (e.g., TCI state) is applied to DL or UL signals starting from the first slot that is Y time units (e.g., 3 ms) after the last symbol of the acknowledgment of PDSCH carrying the MAC-CE for activating beam state (e.g., TCI state). Furthermore, for such case, the activated beam state (e.g., TCI state) by MAC-CE may be a single one.

In addition, if the scheduling or triggering offset corresponding to UE dedicated signals is larger than or equal to a threshold, the beam determination scheme 1 may be applied. In some embodiments, if the offset between DL or UL signals and non-UE dedicated CORESET or PDCCH (e.g., to be monitored) is larger than or equal to the threshold, the beam determination scheme 1 may be applied to the DL or UL signals (e.g., UE dedicated signals).

The beam determination scheme 2 (e.g., Rel-15/16 default beam solution) may specify the QCL assumption for a DL signal (e.g., PDSCH or AP-CSI-RS) whose scheduling off is less than or equal to a threshold determined according to the CORESET. Furthermore, the CORESET may be the one with lowest ID in the last monitored time unit (e.g., slot). The CORESET may be non-UE dedicated CORESET. For instance, the CORESET may be the one with lowest ID from non-UE dedicated CORESET in the last monitoring slot. The threshold or triggering offset between non-UE dedicated CORESET or PDCCH and corresponding PDSCH or AP-CSI-RS may be less than the threshold.

The beam determination scheme 3 (e.g., Rel-15/16 explicit beam indication solution) may specify that the QCL assumption for PDSCH is to be indicated by corresponding MAC-CE, QCL assumption for CORESET carrying scheduling DCI or indicated beam state (e.g., TCI state) in the scheduling DCI. In some embodiments, the beam determination scheme 3 may specify that the QCL assumption or beam state of CORESET, PDCCH, or CSI-RS is indicated based on beam state carried by DCI, media access control, control element (MAC-CE), or radio resource control (RRC). For instance, for AP-CSI-RS, the beam state may be indicated by the triggering state in the DCI.

For co-existence, there may be two types of default beam, such as the beam determination scheme 1 and beam determination scheme 2. Furthermore, there may be a UE capability for supporting the beam determination scheme 1 (e.g., Rel-17 beam indication) and beam determination scheme 2 (e.g., Rel-15/16 default beam). There may be a gNB configuration for enabling beam determination scheme 1, beam determination scheme 2, or both beam determination scheme 1 and beam determination scheme 2.

Considering the backward compatibility, the rules may be used when the above three beam determination schemes are all performed. The offset between non-UE dedicated signals (e.g., PDSCH and CSI-RS) and the corresponding DCI may be greater than or equal to a threshold, meaning that the beam determination scheme 2 is precluded. The non UE dedicated signals (e.g., PDSCH and CSI-RS) may use the beam state (e.g., TCI state) associated with the PCI of serving cell, or beam state (e.g., TCI state) associated with non UE dedicated signal (e.g., CORESET, PDCCH, DCI, or SS set). In some embodiments, the non UE dedicated signals (e.g., PDSCH and CSI-RS) may use the beam state (e.g., TCI state) associated with the PCI of serving cell, or beam state (e.g., TCI state) associated with non UE dedicated signal (e.g., CORESET, PDCCH, DCI, or SS set).

In general, considering that there may be a transmission less than threshold but the UE may not be aware of the existence, the rule for buffering the corresponding PDSCH or AP-CSI-RS reception, or determining beam state or QCL assumption for PDSCH or AP-CSI-RS with scheduling offset or triggering offset when less than a threshold. The rule may be based on the following. The beam determination scheme 1 may have a higher priority over beam determination scheme 2, but lower priority over beam determination scheme 3. Furthermore, beam determination scheme 2 and beam determination scheme 3 may have a higher priority over beam determination scheme 1.

Furthermore, the indicated beam state in the non-UE dedicated CORESET/PDCCH may not be considered when using beam determination scheme 1. Once the following condition is met, the beam determination scheme 2 may be prioritized over beam determination scheme 1, or the beam determination scheme 2 may be applied. The scheduling offset between DL signal (e.g., PDSCH or AP-CSI-RS) and a non-UE dedicated CORESET to be monitored may be less than a threshold.

The non-UE dedicated signal may be within the time unit. The time unit may be determined according to a size of time unit and the time unit of non-UE dedicated CORESET or PDCCH. For instance, if DL signal (e.g., PDSCH or AP-CSI-RS) is in the same slot or next slot of a non-UE dedicated CORESET to be monitored, the beam determination scheme 2 may be applied. The QCL assumption or beam state of the DL signal may be determined according to CORESET with lowest ID in the last monitored slot. In some embodiments, the size of time unit may be RRC or MAC-CE configured. In such case, the UE dedicated signal (e.g., UE dedicated PDSCH) may be still communicated (e.g., received), according to beam determination scheme 1. The scheduling offset or triggering offset corresponding to UE dedicated signal (e.g., PDSCH or AP-CSI-RS) may be more than or equal to the threshold. Otherwise, beam determination scheme 1 may be applied.

If the CORESET or PDCCH and PDSCH are overlapped in a time unit and if beam (e.g., QCL-TypeD) corresponding to CORESET or PDCCH is different from the beam (e.g., QCL-TypeD) corresponding to PDSCH, CORESET or PDCCH reception may be prioritized. In some embodiments, the beam determination scheme 1 may be applied to the PDSCH. In some embodiments, the beam determination scheme 3 may be applied to the CORESET. In some embodiments, the scheduling offset corresponding to the PDSCH may be less than the threshold.

Furthermore, if the CORESET or PDCCH and AP-CSI-RS are overlapped in a time unit and if beam (e.g., QCL-TypeD) corresponding to CORESET/PDCCH is different from the beam (e.g., QCL-TypeD) corresponding to AP-CSI-RS, CORESET or PDCCH reception is prioritized. In some embodiments, the beam determination scheme 1 may be applied to the AP-CSI-RS. In some embodiments, the beam determination scheme 3 may be applied to the CORESET. The scheduling offset corresponding to the AP-CSI-RS may be less than the threshold.

Furthermore, if the triggering state for AP CSI-RS is NOT associated with beam state or if the scheduling offset for CSI-RS is less than the threshold, the beam determination scheme 1 (e.g., unified beam state) may be applied. The AP-CSI-RS may include AP-CSI-RS for channel state information/beam management (CSI/BM). When the CORESET or CSS (e.g., CSS Type-2) is applied with a beam state that is associated with different PCI from the serving cell, at least one of the following may be monitored by the UE. The UE may monitor: all the CSS in the CORESET; CSS that was monitored in the serving cell; CSS corresponding to the SSB that is associated with the previous beam state that is associated with the same PCI with serving cell or not associated with the different PCI from serving cell; CSS corresponding to the SSB that is associated with the beam state; and CSS within a time unit (e.g., a window, a periodicity) that is configured by RRC, among others.

E. Beam Indication when More than One Active Beam States Are Supported

In some embodiments, there may be support of more than one Rel-17 active DL beam state or QCL per band for a UE, and meanwhile gNB may configure more than one active beam state. In general, the non-UE dedicated channel may be updated by legacy beam indication, but the UE dedicated channel may be updated by unified beam indication.

For default beam, if there is a non-UE dedicated SS or CORESET to be monitored in a time units (scheduling offset between the reception of the DL DCI in non-UE dedicated CORESET or SS and the corresponding PDSCH<a threshold), the default beam may be determined according to the non-UE dedicated SS/CORESET (i.e., Rel-15/16 scheme); otherwise Rel-17. If the offset between PDCCH or DCI and its scheduling PDSCH is less than threshold, the scheduling PDSCH may be determined according to the non-UE dedicated SS or CORESET. The non-UE dedicated SS or CORESET may have lowest ID from the non-UE dedicated one. QCL parameters used for PDCCH QCL indication of the non-UE dedicated CORESET may be associated with a monitored search space with lowest CORESET ID in the latest slot in which one or more non-UE dedicated CORESETs within active BWP of the serving cell are monitored by the UE. A mode, such as enableAdditionalPCIforInterCellBeam or enable UnifiedTCI, may be enabled.

Figure 5A:
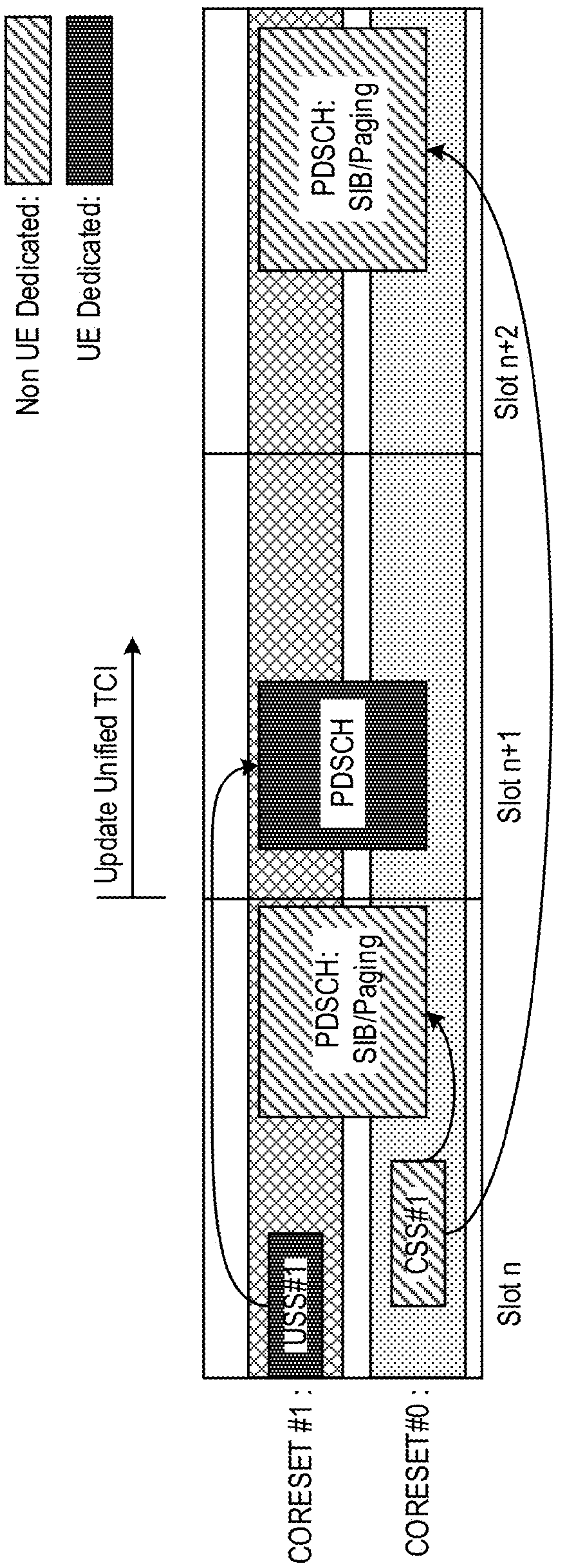
FIG. 5A illustrates a block diagram of a beam indication when more than one active beam or TCI states are supported in accordance with an illustrative embodiment.

Referring now to FIG. 5A, depicted is a block diagram of a beam indication when more than one active beam or TCI states are supported. As depicted, a non-UE dedicated channel and UE-dedicated channel may be applied by different TCI states. The former may be indicated with the TCI state associated with same PCI as the serving cell, but the latter can be indicated with the TCI state associated with the same or different PCI as the serving cell. In such case, the threshold may be assumed to be 28 OFDM symbols.

Under one case, independent default beam buffer or determination for non-UE dedicated and UE dedicated PDSCH may be performed. For UE dedicated PDSCH (PDSCH in slot n+1), the TCI state may be determined according to the updated unified TCI state (e.g., beam determination scheme 1). For non-UE dedicated PDSCH, when the PDSCH has scheduling offset less than the threshold (e.g., PDSCH in slot-n), the QCL assumption for PDSCH reception may be determined according to the CORESET with lowest ID from non-UE dedicated CORESET in the last monitoring slot (e.g., TCI state in CORESET #0 under the beam determination scheme 2). When the PDSCH has scheduling offset larger than or equal to the threshold, the QCL assumption for PDSCH reception (e.g., PDSCH in slot-n+2) may be determined according to the indicated TCI state in CSS #1 (e.g., beam determination scheme 3).

Under another case, a single default beam buffer or determination for non-UE dedicated and UE dedicated PDSCH may be performed. If scheduling offset between DL signal (e.g., PDSCH or AP-CSI-RS) and a non-UE dedicated CORESET to be monitored is less than a threshold, the beam determination scheme 2 may be applied. Otherwise, the beam determination scheme 1 may be applied. PDSCH(s) in the slot-n and slot n+1 may be determined according to according to the CORESET with lowest ID from non-UE dedicated CORESET in the last monitoring slot (e.g., TCI state in CORESET #0 under beam determination scheme 2). If the PDSCH(s) in Slot n+1 is transmitted in Slot n+2, the beam determination scheme 1 may be applied (e.g., based on unified TCI).

F. Beam Indication when Only One Active Beam State Is Supported

If there is the support of only one Rel-17 active DL beam state or QCL per band, beam state for beam determination scheme 1 may be applied, and meanwhile, the beam state for beam determination scheme 2 or 3 may be deactivated. In order to dynamic switching between non-serving cell and serving cell, under scheme 1, there may be a flag in unified MAC-CE for beam state to deactivate any activated beam state for non UE dedicated signal. When beam state is switched from serving cell to non-serving cell, the beam state for non-dedicated channel can be deactivated. As such, the non-dedicated CORESET or SS may not be monitored. Under scheme 2, if beam state is associated with a different PCI from the serving cell, the UE may not to monitor the non-dedicated CORESET or SS.

Figure 6A:
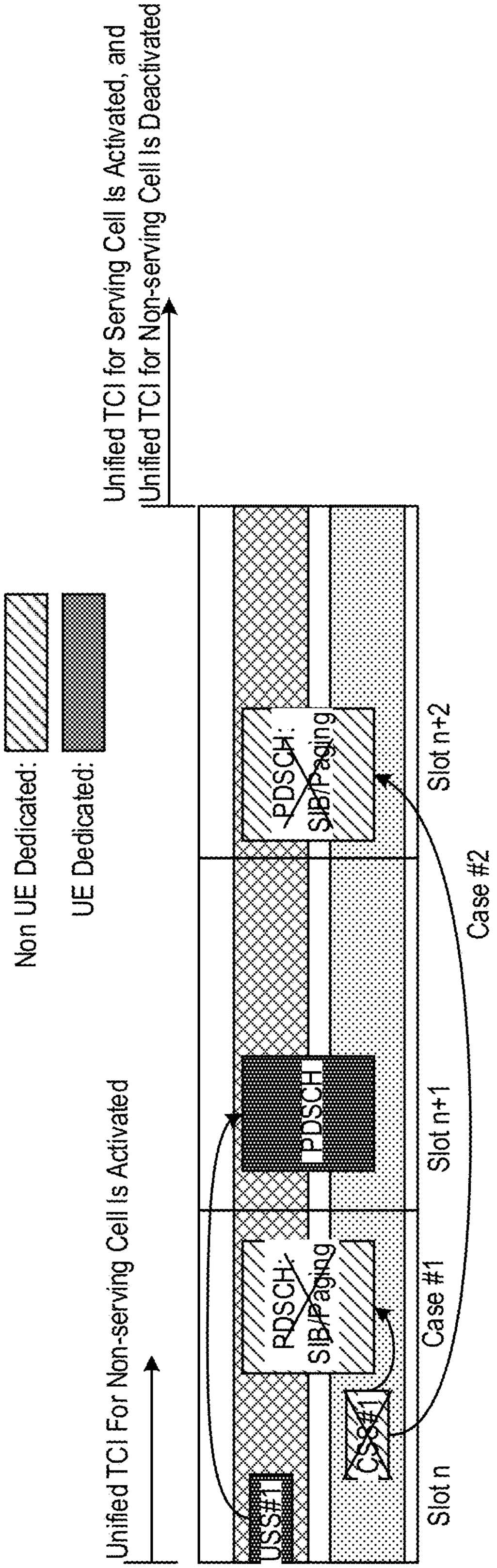
FIG. 6A illustrates a block diagram of an example beam indication when only one active beam or TCI states is supported in accordance with an illustrative embodiment.

Referring now to FIG. 6A, depicted is a block diagram of an example beam indication when only one active TCI are supported. As depicted, in the slot n, the unified TCI for non-serving cell (e.g., TCI state associated with a different PCI from the serving cell) may be activated, and based on the rule, the non-dedicated CORESET or SS may not be monitored.

Figure 6B:
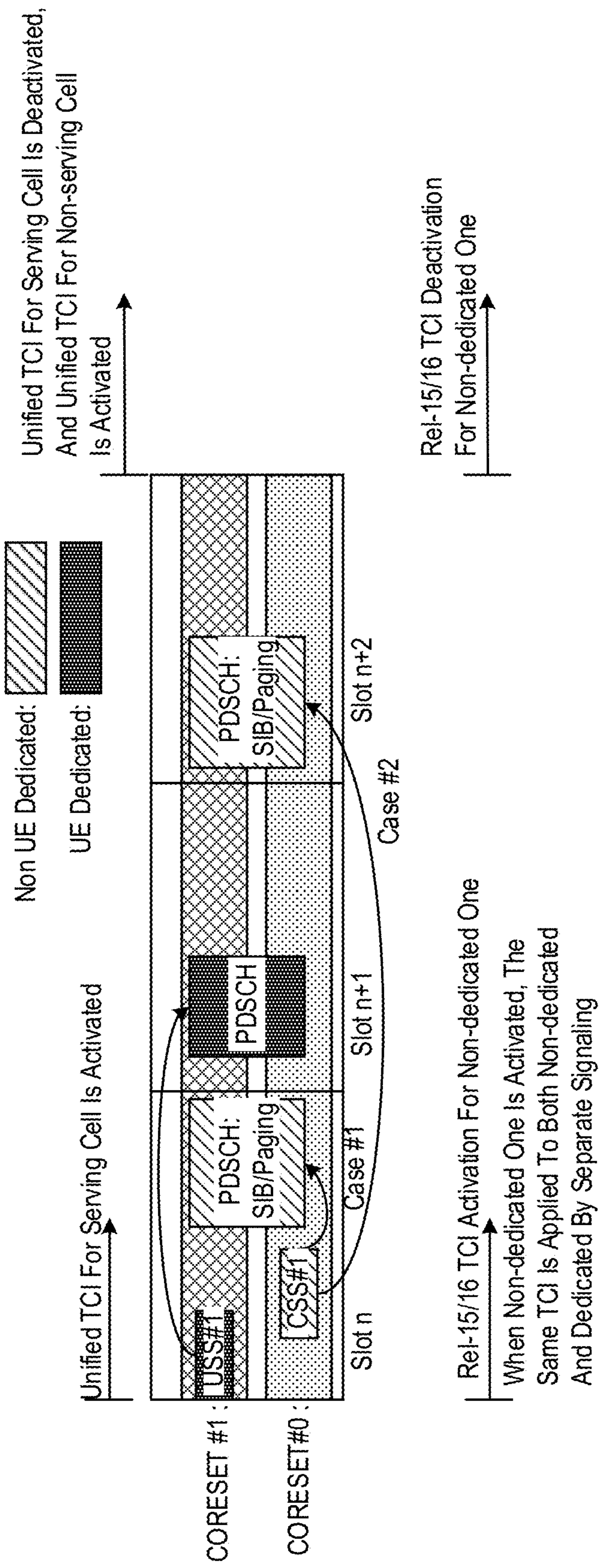
FIG. 6B illustrates a block diagram of another example beam indication when only one active beam or TCI states is supported in accordance with an illustrative embodiment.

Referring now to FIG. 6B, depicted is a block diagram of another example beam indication when only one active TCI are supported. As detailed, unified TCI for serving cell may be activated (e.g., under beam determination scheme 1), and meanwhile, the TCI activation for non-dedicated one (i.e., beam determination scheme 3) may also be applied. As a condition, the same TCI state may be applied to both non-dedicated and dedicated signals by separate signaling. Then, the CSS may be monitored accordingly. After that, serving cell TCI for dedicated and non-dedicated one may be both deactivated in slot n+2, and meanwhile, the TCI for non-serving cell may be activated for UE dedicated signal.

Proposed is a comprehensive approach for inter-cell beam management to accommodate L1-centric mobility and improve the communication reliability. Firstly, the channel or RS which can be switched to the neighboring cells may identified, and the corresponding beam indication approach may be provided for switching the neighboring cells. Then, to handle the channel or RS which can may switch to the neighboring cell and still served by the serving cell, a compatible solution (including signaling design) may be provided. Herein, two different scenarios may be considered, in one case that the UE can support more than one active beam state (e.g., TCI state), and in another case that the UE can only support a single active beam state. Finally, corresponding timeline and rules may be considered for beam being applied to some special channels, such as a CORESET with common search space and PDSCH or AP-CSI-RS whose scheduling offset is less than a threshold.

G. Process for Inter-Cell Beam Management

Figure 7:
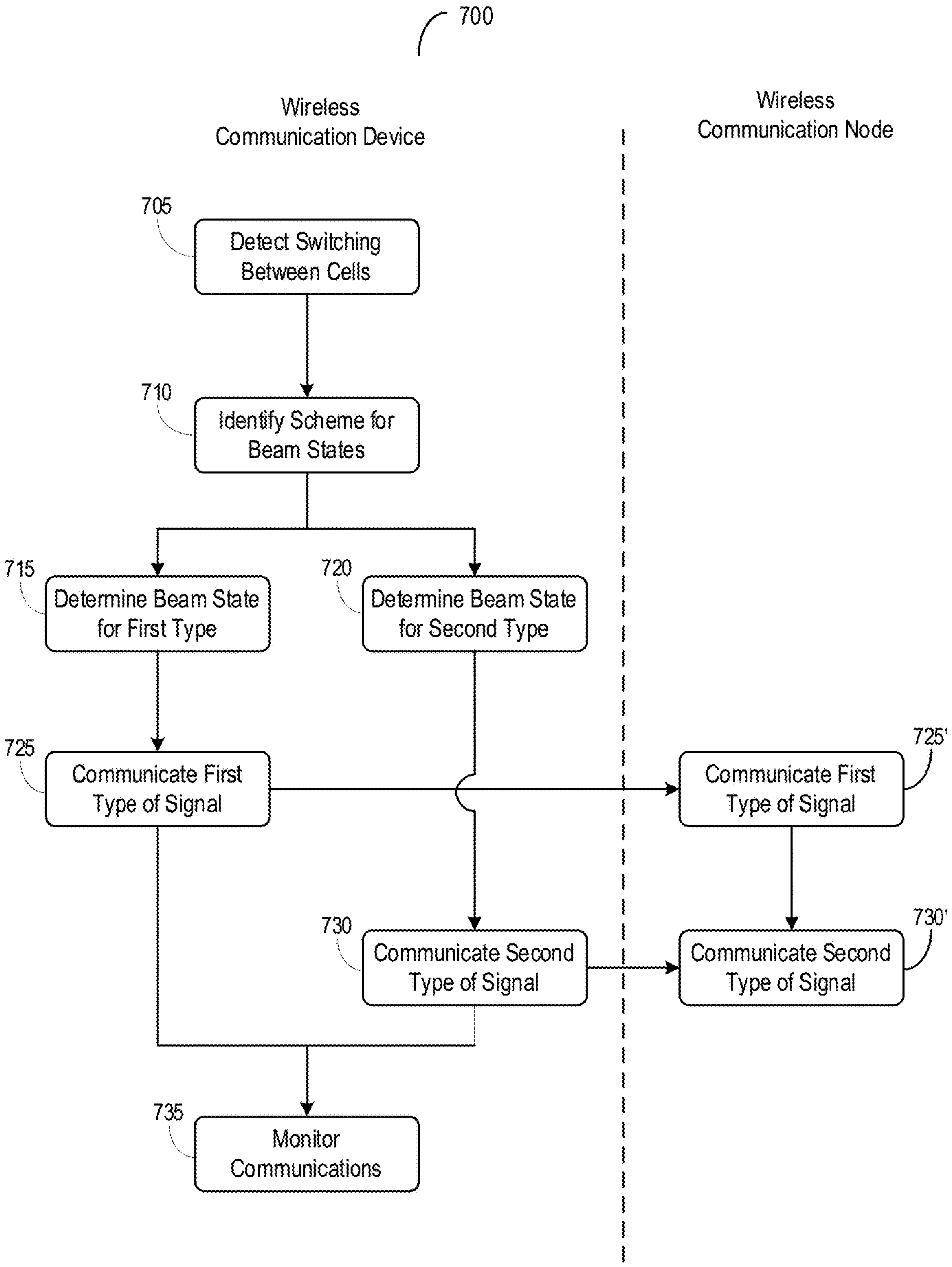
FIG. 7 illustrates a flow diagram of a method of inter-cell beam management in accordance with an illustrative embodiment.

Referring now to FIG. 7, depicted is a flow diagram of a method 700 of inter-cell beam management in accordance. The method 700 may be implemented using or performed by any of the components detailed above, such as the UE 104 or 204 and BS 102 or 202, among others. In brief overview, a wireless communication device may detect switching between cells (705). The wireless communication device may identify a scheme for beam states (710). The wireless communication device may determine a beam state for a first type (715). The wireless communication device may determine a beam state for a second type (720). The wireless communication device may communicate a first type of signal with a wireless communication node (725 and 725'). The wireless communication device may communicate a second type of signal with a wireless communication node (730 and 730'). The wireless communication device may monitor communications (735).

In further detail, a wireless communication device (e.g., UE 104 or 204) may identify, monitor for, or detect switching between cells (705). The switching between cells may correspond to when the wireless communication device is moving from one cell to a neighboring cell. Each cell may include at least one transmission/reception point or at least one wireless communication node (e.g., BS 102 and 104). The cell may correspond to a coverage area within a communication range of the wireless communication node serving the wireless communication device. The wireless communication device while moving may be physically situated in the coverage area of two or more wireless communications nodes.

The wireless communication device may determine, select, or otherwise identify a scheme to apply for determination of beam states for signals (710). There may be three schema supported by the wireless communication device, such as a first scheme, a second scheme, and a third scheme, among others. In some embodiments, the wireless communication device may select the scheme based on a capability or configuration of the wireless communication device. In some embodiments, the wireless communication device may have a capability for supporting the first scheme and the second scheme. In some embodiments, the wireless communication device may receive a configuration to enable the first scheme, the second scheme, or both the first scheme and second scheme. In some embodiments, the wireless communication device may consider an indicated beam state in a second type of signal (e.g., a non-UE dedicated signal), when the first scheme is enabled.

In some embodiments, the wireless communication device may identify the scheme in accordance with a priority. In some embodiments, the first scheme may have a higher priority than the second scheme, and a lower priority than the third scheme. The second scheme and the third scheme each may have a higher priority than the first scheme. The second scheme may have higher priority than the first scheme. In some embodiments, the wireless communication may identify the scheme (e.g., the first scheme or the second scheme) based on a condition. The condition may identify or include a scheduling offset between the downlink signal. In some embodiments, the condition may further identify that a second type of signal (e.g., a non-UE dedicated signal) is less than a threshold and the second type of signal is within a time unit. When the condition is met, the wireless communication device may identify the second scheme to apply. Otherwise, when the condition is not met, the wireless communication device may identify the first scheme to apply. In some embodiments, an offset between the second type of signal and a corresponding downlink control information (DCI) signaling may be greater than or equal to a threshold. In some embodiments, a downlink signal may be buffered. A beam state or quasi-co-location (QCL) assumption may be determined by the wireless communication device for the downlink signal.

The wireless communication device may identify or determine a first beam state for a first type of signal (715). The first beam state may be associated with the first type of signal. The first type of signal may include a UE dedicated channel or a UE dedicated reference signal (RS), and may differ from a second type of signal that may include a non-UE dedicated channel or a non-UE dedicated RS. In some embodiments, the first beam state may be associated with a physical cell identifier (PCI) different from a PCI of a serving cell. In some embodiments, the first beam state may identify or include at least one of a quasi co-location (QCL) assumption, a transmission configuration indicator (TCI) state, a spatial relation, a reference signal (RS), a spatial filter or a pre-coding, among others. In some embodiments, the wireless communication device may determine the first beam state in accordance with the beam determination scheme, such as the first scheme, the second scheme, and the third scheme.

In some embodiments, the first type of signal may identify or include a control resource set (CORESET), physical downlink control channel (PDCCH) or search space (SS) set, a physical downlink shared channel (PDSCH), physical uplink shared channel (PUSCH), physical uplink control channel (PUCCH), channel state information RS (CSI-RS), or sounding RS (SRS), among others. In some embodiments, the first type of signal may identify or include a control resource set (CORESET) or search space (SS) set other than the second type of signal, or other than a non-UE dedicated CORESET or SS set. In some embodiments, the first type of signal may identify or include a CORESET or a physical downlink control channel (PDCCH) that is not associated with a type-0 or type-0A common SS (CSS) set. In some embodiments, the first type of signal may identify or include a CORESET or a PDCCH that is not associated with a type-0, type-0A or type-1 CSS set.

In some embodiments, the first type of signal may identify or include a CORESET or a PDCCH that is not associated with a type-0, type-0A, type-1 or type-2 CSS set. In some embodiments, the first type of signal may identify or include a CORESET or a PDCCH that is only associated with a USS, one or both of the USS and a type-3 CSS set, one or both of the USS and a type-2 or type 3 CSS set, or one or both of the USS and a type-1, type-2 or type 3 CSS set. In some embodiments, the first type of signal may identify or include a CORESET or a PDCCH with a flag, the flag to indicate that the CORESET or the PDCCH share a same beam state as the first type of signal, or to indicate that the first scheme is applied to the CORESET or the PDCCH.

In some embodiments, the first type of signal may identify or include a signal that is not scheduled by or initialized by the second type of signal, or by a non-UE dedicated CORESET or search space (SS) set. For example, the signal may be a physical downlink shared channel (PDSCH), a physical uplink shared channel (PUSCH), a physical downlink control channel (PUCCH), a channel state information reference signal (CSI-RS) or a sounding reference signal (SRS), among others. In some embodiments, the first type of signal may identify or include a signal with a flag. The flag may indicate that the first scheme is applied to the signal. The signal may also be a physical downlink shared channel (PDSCH), a physical uplink shared channel (PUSCH), a physical downlink control channel (PUCCH), a channel state information reference signal (CSI-RS) or a sounding reference signal (SRS, among others. In some embodiments, the first type of signal may identify or include a signal scheduled by or initialized by downlink control information (DCI).

In some embodiments, the DCI may be associated with or may correspond to a control resource set (CORESET) or search space (SS) set other than the second type of signal, or other than a non-UE dedicated CORESET or SS set. In some embodiments, the DCI may be associated with or may correspond to a CORESET or a physical downlink control channel (PDCCH) that is not associated with a type-0 or type-0A common SS (CSS) set. In some embodiments, the DCI may be associated with or may correspond to a CORESET or a PDCCH that is not associated with a type-0, type-0A or type-1 CSS set. In some embodiments, the DCI may be associated with or may correspond to a CORESET or a PDCCH that is not associated with a type-0, type-0A, type-1 or type-2 CSS set. In some embodiments, the DCI may be associated with or may correspond to a CORESET or a PDCCH that is only associated with a USS, one or both of the USS and a type-3 CSS set, one or both of the USS and a type-2 or type 3 CSS set, or one or both of the USS and a type-1, type-2 or type 3 CSS set. In some embodiments, the DCI may be associated with or may correspond to a CORESET or a PDCCH with a flag, the flag to indicate that the CORESET or the PDCCH share a same beam state as the first type of signal, or to indicate that the first scheme is applied to the CORESET or the PDCCH.

The wireless communication device may identify or determine a second beam state for a second type of signal (e.g., a non-UE dedicated signal) (720). The determination of the second beam state for the second type of signal may be performed by the wireless communication device concurrent with the determination of the first beam state for the first type of state for the first type of signal. The second beam state may be associated with the second type of signal. The second type of signal may include a non UE dedicated channel or a non UE dedicated RS. The second type of signal may also include a non-UE dedicated CORESET, PDDCH, or SS set, among others.

In some embodiments, the second beam state may be associated with a PCI that is same as the PCI of the serving cell. In some embodiments, the second beam state may be associated with the serving cell. In some embodiments, the second beam state my identify or include at least one of a quasi co-location (QCL) assumption, a transmission configuration indicator (TCI) state, a spatial relation, a reference signal (RS), a spatial filter or a pre-coding. In some embodiments, the wireless communication device may determine the first beam state in accordance with the beam determination scheme, such as the first scheme, the second scheme, and the third scheme. In some embodiments, the second type of signal may identify or include a control resource set (CORESET), physical downlink control channel (PDCCH) or search space (SS) set, a physical downlink shared channel (PDSCH), physical uplink shared channel (PUSCH), physical uplink control channel (PUCCH), channel state information RS (CSI-RS), or sounding RS (SRS), among others.

In some embodiments, the second type of signal may identify or include a type-0, type-0A, type-1, type-2, or type-3 common search space (CSS) set. The CSS set can be associated with a synchronization block (SSB) of the second TCI state that is activated or indicated. In some embodiments, the second type of signal may identify or include a control resource set (CORESET) or a physical downlink control channel (PDCCH) associated with the type-0, type-0A, type-1 or type-2 CSS set. In some embodiments, the second type of signal may identify or include a CORESET or a PDCCH with a flag, the flag to indicate that the CORESET or the PDCCH does not share a same beam state as the first type of signal, to indicate that a second scheme or a third scheme is applied to the CORESET or the PDCCH, or to indicate that the first scheme is precluded from being applied to the CORESET or the PDCCH. In some embodiments, the second type of signal may identify or include a CORESET or a PDCCH with a SS set for beam failure recovery, or CORESET #0.

In some embodiments, the second type of signal may identify or include a configured grant PDSCH. In some embodiments, the second type of signal may identify or include a configured grant PUSCH. In some embodiments, the second type of signal may identify or include a signal scheduled by or initialized by downlink control information (DCI). The signal may be, for example, a PDSCH, PUSCH, PUCCH, CSI-RS, or SRS, among others. In some embodiments, the DCI may correspond to a type-0, type-0A, type-1, type-2, or type-3 common search space (CSS) set. The CSS can be associated with a synchronization block (SSB) of the second TCI state that is activated or indicated. In some embodiments, the DCI may correspond to a control resource set (CORESET) associated with the type-0, type-0A, type-1 or type-2 CSS set. In some embodiments, the DCI may correspond to a CORESET with a flag, the flag to indicate that the CORESET or the PDCCH does not share a same beam state as the first type of signal, to indicate that a second scheme or a third scheme is applied to the CORESET or the PDCCH, or to indicate that the first scheme is precluded from being applied to the CORESET or the PDCCH. In some embodiments, the DCI may correspond to a CORESET with a search space (SS) for beam failure recovery, or CORESET #0.

The wireless communication device may communicate a first type of signal with the wireless communication node (725 and 725'). In communicating, the wireless communication device may transmit the first type of signal to the wireless communicate node. Conversely, the wireless communication node may receive the first type of signal from the wireless communication device. The wireless communication device may communicate the second type of signal with the wireless communication node (730 and 730'). In some embodiments, the second type of signal uses the second beam state (e.g., the TCI state associated with the PCI of serving cell). In communicating, the wireless communication device may transmit the second type of signal to the wireless communicate node. Conversely, the wireless communication node may receive second first type of signal from the wireless communication device. The communication of the second type of signal may be performed concurrent to the communication of the first type of signal.

The wireless communication device may apply a beam state (e.g., the first beam state or the second beam state) in communicating the first type of signal and the second type of signal. In some embodiments, if a control resource set (CORESET) or physical downlink control channel (PDCCH) and a physical downlink shared channel (PDSCH) or channel state information reference signal (CSI-RS) are overlapped in a time units, and if a beam state corresponding to the CORESET or PDCCH is different from that corresponding to the PDSCH or CSI-RS, then reception of the CORESET or PDCCH may be prioritized.

Under the first scheme, the wireless communication device may apply a beam state (e.g., the first beam state or the second beam state) to at least one uplink (UL) signal, at least one downlink (DL) signal, or both. The beam state may start from a first slot that is a defined number of time units after an acknowledgement corresponding to the DCI carrying an indication of the first beam state. In some embodiments, the beam state may include more than one beam states activated by a medium access control control element (MAC CE) signaling. In addition, the wireless communication device may apply the beam state to at least one UL signal, at least one DL signal, or both, starting from a first slot that is a second defined number of time units after an acknowledgement of a physical downlink shared channel (PDSCH) carrying a MAC CE signaling for activating the at least one beam state. In some embodiments, the beam state may include a single beam state. In some embodiments, a mode for enabling the first scheme or inter-cell beam management may be enabled.

The wireless communication device may determine to apply the first beam state based on scheduling or offset. In some embodiments, if a scheduling or triggering offset corresponding to the first type of signal is larger than or equal to a threshold, the beam state determined by the first scheme may be applied by the wireless communication device to the first type of signal. In some embodiments, if an offset between the first type of signal and the second type of signal is larger than or equal to the threshold, the one beam state determined by the first scheme may be applied by the wireless communication device to the first type of signal. In some embodiments, the beam state corresponding to the PDSCH or CSI-RS may be determined by the wireless communication device according to the first scheme. A scheduling or triggering offset corresponding to the PDSCH or CSI-RS may be less than a threshold. In some embodiments, if a triggering state for the CSI-RS is not associated with the at least one beam state, or if a scheduling offset for the CSI-RS is less than the threshold, the beam state corresponding to the CSI-RS may be determined by the wireless communication device according to the first scheme.

Under the second scheme, the wireless communication device may apply the beam state (e.g., the first beam state or the second beam state) to a downlink signal whose scheduling or triggering offset is less than or equal to a threshold. The beam state may be determined by the wireless communication device according to a control resource set (CORESET). The second type of signal may include a control resource set (CORESET), physical downlink control channel (PDCCH) or search space (SS) set. The second type of signal may be monitored by the wireless communication device. In some embodiments, the CORESET may identify or include a CORESET with a lowest index in a last monitored time unit. In some embodiments, the CORESET may identify or include a non-UE dedicated CORESET. In some embodiments, the CORESET may identify or include a CORESET with a lowest index from another second type of signal in the last monitoring time unit.

In some embodiments, if a scheduling or triggering offset between the second type of signal and another second type of signal is less than a threshold, the at least one beam state may be determined by the wireless communication device according to the second scheme. The second type of signal may include at least one of: a physical downlink shared channel (PDSCH), or a channel state information reference signal (CSI-RS). The another second type of signal may include at least one of: a control resource set (CORESET) or a physical downlink control channel (PDCCH) scheduling or triggering the second type of signal, among others.

Under the third scheme, the wireless communication device may apply the beam state (e.g., the first beam state or the second beam state) to a physical downlink shared channel (PDSCH). The at least one beam state may be indicated by: a corresponding medium access control control element (MAC CE) signaling, a beam state for a CORESET carrying a scheduling downlink control information (DCI), or an indicated beam state in the scheduling DCI, among others. In some embodiments, the wireless communication device may apply the beam state to a CORESET, physical downlink control channel (PDCCH) or channel state information reference signal (CSI-RS). The beam state may be indicated via downlink control information (DCI), medium access control control element (MAC CE) or radio resource control (RRC) signaling, among others. In some embodiments, the beam state corresponding to the CORESET may be determined according to the third scheme.

The wireless communication device may monitor communications (735). In some embodiments, if the type-0, type-0A, type-1 or type-2 CSS set can be associated with a synchronization block (SSB) of the second beam state that is activated or indicated, the wireless communication device may monitor the type-0, type-0A, type-1, or type-2 CSS set, among others. In some embodiments, the wireless communication device may monitor a PDCCH associated with the type-0, type-0A, type-1, or type-2 CSS set; or a CORESET associated with the type-0, type-0A, type-1, or type-2 CSS set, among others.

In some embodiments, when a CORESET or a common search space (CSS) is applied with a beam state that is associated with a physical cell identifier (PCI) different from that of a serving cell, the wireless communication device may monitor the CSS. The wireless communication device may monitor: all CSSs in the CORESET; a CSS that is monitored in the serving cell; a CSS corresponding to a synchronization signal block (SSB) associated with a previous beam state that is associated with a PCI that is same as that of the serving cell or not associated with the PCI different from that of the serving cell; a CSS corresponding to a SSB associated with the beam state; or a CSS within a time unit that is configured by radio resource control (RRC) signaling, among others.

In some embodiments, if the second type of signal is to be monitored in a time unit, the beam state corresponding to an uplink signal and a downlink signal may be determined by the wireless communication device according to the second scheme. In some embodiments, if an offset between a physical downlink control channel (PDCCH) or downlink control information (DCI) signaling and a corresponding scheduling physical downlink shared channel (PDSCH) or channel state information reference signal (CSI-RS) is less than a threshold, the beam state corresponding to the scheduling PDSCH or CSI-RS may be determined by the wireless communication device according to the second type of signal.

In some embodiments, the wireless communication device may determine whether to monitor the first type or the second type of signal in accordance with the beam state applied. In some embodiments, a medium access control control element (MAC CE) may have a flag for a beam state, to deactivate any activated beam state for the second type of signal. In some embodiments, when the first beam state is applied, a beam state for the second type of signal can be deactivated, or the second type of signal may not be monitored by the wireless communication device. In some embodiments, when a beam state is associated with a physical cell identifier (PCI) different from that of a serving cell, the wireless communication device may not monitor the second type of signal.

In some embodiments, the wireless communication device may monitor an active bandwidth part (BWP) of the serving cell. In some embodiments, the second type of signal may have a lowest index (ID) of a plurality of second type of signals. In some embodiments, the beam state may be determined by the wireless communication device according to the second type of signal that is associated with a search space with a lowest control resource set (CORESET) index (ID) in a latest slot in which one or more second type of signals within an active bandwidth part (BWP) of a serving cell are monitored by the wireless communication device.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

identifying, by a wireless communication device, from a plurality of schemes, a scheme for determining a first beam state and a second beam state based on a configuration of the wireless communication device;

determining, by a wireless communication device in accordance with the scheme, the first beam state associated with a first type of signal, wherein the first beam state is associated with a physical cell identifier (PCI) different from that of a serving cell;

determining, by the wireless communication device in accordance with the scheme, the second beam state associated with a second type of signal, according to a control resource set (CORESET) with a lowest index in a last monitored time unit, wherein the second type of signal comprises a downlink (DL) signal whose scheduling offset is less than a threshold, and wherein the second beam state comprises a quasi co-location (QCL) assumption; and applying, by the wireless communication device, the second beam state to the second type of signal.

2. The method of claim 1, wherein the first beam state comprises a transmission configuration indicator (TCI) state.

3. The method of claim 1, wherein the second type of signal comprises:

a physical downlink shared channel (PDSCH).

4. The method of claim 1, wherein the first type of signal comprises:

a physical downlink control channel (PDCCH) that is only associated with both of a UE-specific search space (USS) and a type-3 common search space (CSS) set.

5. The method of claim 1, wherein the first type of signal comprises a physical downlink control channel (PDCCH), and the second type of signal comprises a physical downlink shared channel (PDSCH), and if the PDCCH and the PDSCH are overlapped in a time unit, and if a beam state corresponding to the PDCCH is different from that corresponding to the PDSCH, then reception of the PDCCH is prioritized.

6. The method of claim 1, wherein the first type of signal comprises at least one of a user equipment (UE) dedicated channel or a UE-dedicated reference signal (RS), and wherein the second type of signal comprises at least one of a non-UE dedicated channel or a non-UE dedicated RS.

7. The method of claim 1, wherein the plurality of schemes comprises at least one of:

a first scheme including applying at least one beam state to at least one of an uplink (UL) signal or the DL signal, a second scheme including applying the at least one beam state to the DL signal whose scheduling offset relative to the UL signal is less than the threshold, or a third scheme including applying the at least one beam state to a physical downlink shared channel (PDSCH), CORESET, physical downlink control channel (PDCCH) or channel state information reference signal (CSI-RS).

8. A wireless communication device, comprising:

at least one processor configured to:

identify from a plurality of schemes, a scheme for determining a first beam state and a second beam state based on a configuration of the wireless communication device;

determine the first beam state associated with a first type of signal in accordance with the scheme, wherein the first beam state is associated with a physical cell identifier (PCI) different from that of a serving cell;

determine the second beam state associated with a second type of signal in accordance with the scheme, according to a control resource set (CORESET) with a lowest index in a last monitored time unit, wherein the second type of signal comprises a downlink (DL) signal whose scheduling offset is less than a threshold, and wherein the second beam state comprises a quasi co-location (QCL) assumption; and apply the second beam state to the second type of signal.

9. The wireless communication device of claim 8, wherein the first beam state comprises a transmission configuration indicator (TCI) state.

10. The wireless communication device of claim 8, wherein the second type of signal comprises:

a physical downlink shared channel (PDSCH).

11. The wireless communication device of claim 8, wherein the first type of signal comprises:

a PDCCH that is only associated with both of a UE-specific search space (USS) and a type-3 common search space (CSS) set.

12. The wireless communication device of claim 8, wherein the first type of signal comprises a physical downlink control channel (PDCCH), and the second type of signal comprises a physical downlink shared channel (PDSCH), and if the PDCCH and the PDSCH are overlapped in a time unit, and if a beam state corresponding to the PDCCH is different from that corresponding to the PDSCH, then reception of the PDCCH is prioritized.

13. The wireless communication device of claim 8, wherein the plurality of schemes comprises at least one of:

a first scheme including applying at least one beam state to at least one of an uplink (UL) signal or the DL signal, a second scheme including applying the at least one beam state to the DL signal whose scheduling offset relative to the UL signal is less than the threshold, or a third scheme including applying the at least one beam state to a physical downlink shared channel (PDSCH), CORESET, physical downlink control channel (PDCCH) or channel state information reference signal (CSI-RS).

14. A method comprising:

communicating, by a wireless communication node with a wireless communication device, a first type of signal, wherein a first beam state is associated with the first type of signal, and a second beam state is associated with a second type of signal, the first beam state is associated with a physical cell identifier (PCI) different from that of a serving cell, and communicating, by the wireless communication node with the wireless communication device, the second type of signal to which the second beam state is applied by the wireless communication device, wherein the second beam state comprises a quasi co-location (QCL) assumption and is determined by the wireless communication device according to a control resource set (CORESET) with a lowest index in a last monitored time unit, wherein the second type of signal comprises a downlink (DL) signal whose scheduling offset is less than a threshold, wherein the first beam state and the second beam state are determined according to a scheme, wherein the scheme is identified from a plurality of schemes based on a configuration of the wireless communication device.

15. A wireless communication node, comprising:

at least one processor configured to:

communicate, via a transceiver with a wireless communication device, a first type of signal, wherein a first beam state is associated with the first type of signal, and a second beam state is associated with a second type of signal, the first beam state is associated with a physical cell identifier (PCI) different from that of a serving cell, and communicate, via the transceiver with the wireless communication device, the second type of signal to which the second beam state is applied by the wireless communication device, wherein the second beam state comprises a quasi co-location (QCL) assumption and is determined by the wireless communication device according to a control resource set (CORESET) with a lowest index in a last monitored time unit, wherein the second type of signal comprises a downlink (DL) signal whose scheduling offset is less than a threshold, wherein the first beam state and the second beam state are determined according to a scheme, wherein the scheme is identified from a plurality of schemes based on a configuration of the wireless communication device.

16. The wireless communication node of claim 15, wherein the first beam state comprises a transmission configuration indicator (TCI) state.

17. The wireless communication node of claim 15, wherein the second type of signal comprises:

a physical downlink shared channel (PDSCH).

18. The wireless communication node of claim 15, wherein the first type of signal comprises:

a physical downlink control channel (PDCCH) that is only associated with both of a UE-specific search space (USS) and a type-3 common search space (CSS) set.

19. The wireless communication node of claim 15, wherein the first type of signal comprises a physical downlink control channel (PDCCH), and the second type of signal comprises a physical downlink shared channel (PDSCH), and if the PDCCH and the PDSCH are overlapped in a time unit, and if a beam state corresponding to the PDCCH is different from that corresponding to the PDSCH, then reception of the PDCCH is prioritized.

20. The wireless communication node of claim 15, wherein the plurality of schemes comprises at least one of:

a first scheme including applying at least one beam state to at least one of an uplink (UL) signal or the DL signal, a second scheme including applying the at least one beam state to the DL signal whose scheduling offset relative to the UL signal is less than the threshold, or a third scheme including applying the at least one beam state to a physical downlink shared channel (PDSCH), CORESET, physical downlink control channel (PDCCH) or channel state information reference signal (CSI-RS).

* * * * *